Patented Feb. 14, 1939

2,146,735

UNITED STATES PATENT OFFICE 2,146,735

STABILIZATION OF POLYVINYL ACETAL RESINS

Joseph B. Hale, Rochester, N. Y., assignor to Eastman Kodak Company, Rochester, N. Y., a corporation of New Jersey No Drawing. Application June 23, 1937, Serial No. 149,916

15 Claims. (Cl. 260—2)

This invention relates to the stabilization of a polyvinyl acetal resin by subjecting either its polyvinyl intermediate or the resin itself to the action of a compound containing an NOH group nitrogen being trivalent) or its salt. The treatment of the resin may take place either in the reaction mixture employed in its preparation or on the resin itself after separating it from the reaction constituents. This is a continuation-in-part of my application Serial No. 129,248, entitled, "Stabilization of polyvinyl acetal resins", filed March 5, 1937.

The instability of polyvinyl acetal resins has been a problem in the art of making and using that type of resin. For instance, a product can be made therefrom and some time later the product might be dark and degraded, thus terminating its commercial usefulness.

One object of my invention is to prepare polyvinyl acetal resins which do not exhibit a tendency to degrade upon aging or darken when heated. Another object of my invention is to render polyvinyl acetal resins stable so that they may be employed for use in making commercial products whose life is not shortened by the breakdown of the resin which might otherwise occur without a stabilization treatment such as in accordance with my invention.

The instability of polyvinyl acetal resins may be manifested in various ways, such as by the brittleness and increased color of an aged film of the resin. This characteristic is, of course, very detrimental in most cases where a resin film may be employed.

In the laboratory the amount of stability is determined by subjecting the product to an elevated temperature for a prescribed period of time. One method of determining the stability is by heating a sample of the resin to a temperature of about 180° C. in a stream of nitrogen and measuring the decomposition products formed. These products are formed by passing the gases given off over heated copper oxide which oxidizes these gases to carbon dioxide and water, whereupon the carbon dioxide gas is cooled and weighed.

The preferred method of ascertaining stability is to heat a sample of the resin at about 110° C. for 24 hours and then measure the loss of viscosity of a 5% solution of the resin in acetic acid. The viscosity may be determined in any customary manner, such as by the use of a viscosimeter. In this test a polyvinyl acetal resin, which has not been stabilized, shows a decided drop in viscosity. The following data illustrate the drop in viscosity upon heating:

|  | Original viscosity | Viscosity after heating for 24 hours at 110° C. |
|---|---|---|
|  | *Centipoises* | *Centipoises* |
| Polyvinyl acetal resins which were not stabilized | 209 | 15 |
|  | 199 | 11 |
|  | 102 | 23 |

I have found that by treatment of the polyvinyl intermediate, such as polyvinyl alcohol or polyvinyl acetate, with a compound containing an NOH group in the reaction mixture employed to prepare a polyvinyl acetal resin or by treatment of the polyvinyl acetal resin, after its formation, with such a compound, that a resin is formed exhibiting stability as evidenced by testing by the method outlined above. This shows that polyvinyl acetal resins, which have been stabilized by my invention, can be employed to prepare commercial products without any darkening or degradation occurring in use. These stabilized acetal resins are, therefore, particularly adapted to use in fine arts, such as in the making of photographic film.

Due to the comparative instability of polyvinyl acetal resins, it is preferred that the treatment with the stabilizing agent occur prior to the heat-drying of the resin after separating it from its reaction mixture. If desired, the treatment may be applied before the washing of the resin so that the stabilizing compound will thereby be removed along with the other materials with which it is in contact. Nevertheless, a compound as described will, also, have a stabilizing effect as an agent of addition to the resin after it has been heat-dried, but preferably before the resin has been stored for a length of time sufficient to result in degradation.

I have found that it is unnecessary, however, that the stabilizing compound remain incorporated in the resin, the only requirement being that the resin or its polyvinyl intermediate be treated therewith either after its formation or during its preparation.

The following examples illustrate the preparation of a stable polyvinyl acetal resin in accordance with my invention.

Example I

An alcoholic solution of 33 parts of a polyvinyl acetate, such as prepared by the process of U. S. Patent No. 1,586,803, was treated with 2 parts of hydroxylamine hydrochloride, neutralized with 2 parts of potassium hydroxide. The mass was heated at 40° C. for one hour. 20 parts of paraldehyde and 10 parts of concentrated hydrochloric acid were then added and the mixture was kept at 40° C. for 4 days. The product was precipitated, washed and heat-dried. Upon testing its stability, it was found that the product exhibited the same viscosity, after heating at 110° C. for 24 hours, as prior to the heating.

Example II 200 grams of polyvinyl acetate was dissolved in 500 cc. of ethyl alcohol and cooled to below room temperature. 50 cc. of 35% hydrochloric acid was slowly added, meanwhile stirring and cooling. One gram of hydroxylamine hydrochloride was then added followed by 48.8 grams of butyraldehyde and 51.2 grams of paraldehyde. The mass was thoroughly mixed and after standing for a couple of hours, was placed in a bath maintained at 40° C. for 4 days. It was then precipitated in cold water, washed and heat-dried. The viscosity of the polyvinyl acetal resin formed was 116 centipoises and after heating for 24 hours at 110° C., its viscosity was 95 centipoises.

Example III 200 pounds of vinyl acetate was freshly distilled into a vessel containing .8 pound of hydroxylamine hydrochloride. This mixture was heated at 75° C. overnight with .20 pound of benzoyl peroxide therein. A clear hard polyvinyl acetate was formed. 100 pounds of this polyvinyl acetate was converted to a polyvinyl acetal resin by solution in 300 pounds of ethyl alcohol and adding to the solution a mixture of 50 pounds of paraldehyde and 25 pounds of concentrated hydrochloric acid thereto and maintaining the mass for 4 days at a temperature of 40° C. The resin formed was precipitated in cold water, washed and heat-dried. The resin formed was found to have a viscosity of 115 centipoises. After heating for 24 hours at 110° C., it was found to have a viscosity of 93 centipoises.

Example IV 100 grams of polyvinyl acetate was dissolved in 300 cc. of ethyl alcohol and cooled to below room temperature. 25 cc. of 35% hydrochloric acid was slowly added, meanwhile stirring and cooling. 2 grams of phenylhydroxylamine oxalate was then added followed by 50 cc. of paraldehyde. The mass was thoroughly mixed and then placed in a bath maintained at 40° C. for 4 days. The product was then precipitated in cold water, washed free of the reaction ingredients and heat-dried. This resin was tested for stability; whereas its original viscosity was 319 centipoises, its viscosity after heating 24 hours at 110° C. was 292.

Other organic compounds having an NOH group where the nitrogen is trivalent were also found to be suitable for stabilizating polyvinyl acetal resins. Example IV was repeated using each of the following compounds in the same amount as the phenylhydroxylamine. That in each case a stabilized resin is obtained is shown by the following data giving the viscosity of the resin prepared using the stabilizer given, both before and after heating.

| Stabilizer | Viscosity before heating | Viscosity after heating 24 hrs. at 110° C. |
|---|---|---|
| | Centipoises | Centipoises |
| Acetoxime | 140.4 | 136.5 |
| Butyraldoxime | 147.6 | 116.0 |
| Salicyloxime | 141.6 | 114.6 |
| Dimethyl glyoxime | 141.0 | 109.5 |

Nitrous acid may be employed to stabilize the resins as described and claimed by Fordyce and Salo in their application Serial No. 159,193, filed August 14, 1937.

Other compounds which may be employed to stabilize resins in accordance with my invention are the hydroxamic acids having the formula

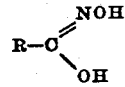

where R is hydrogen or an alkyl group, and nitroso hydroxylamine.

The following resins are exemplary of those which may be stabilized in accordance with my invention. It is to be understood that this list is not limiting but illustrative:

Polyvinyl acetate and other esters
Polyvinyl co-polymers (polyvinyl chloride-acetate)
Polyvinyl acetaldehyde acetal
Polyvinyl formaldehyde acetal
Polyvinyl propionaldehyde acetal
Polyvinyl butyraldehyde acetal Mixed polyvinyl acetals such as:

Polyvinyl formaldehyde-acetaldehyde acetal
Polyvinyl butyraldehyde-acetaldehyde acetal
Polyvinyl benzaldehyde-acetaldehyde acetal
Polyvinyl furfuraldehyde-acetaldehyde acetal
Polyvinyl acetone acetaldehyde ketacetal
Polyvinyl cyclohexanone acetaldehyde ketacetal As may be seen from the examples, my stabilizing agent may be added either in the form of its salt or as the amine itself. As hydrochloric acid is ordinarily employed to promote the condensation of the polyvinyl compound with the aldehydes, under the preferred conditions even though the amine itself has been added, it will be present in the reaction mixture in the form of its salt.

The polyvinyl acetal resins, stabilized by my process, are particularly suitable for the preparation of photographic film or any other commercial product where the transmission of light is an important factor. Another instance of such a use is as an intermediate layer in the making of laminated or "safety" glass. These stabilized resins may, also, be employed for making artificial yarn, lacquers, molding compositions, impregnated textiles or laminated products. For instance, sheets of these stabilized resins may be laminated with layers of wood, metal, paper, glass, cellulose ester, etc. These stabilized resins may be employed for electrical insulation, especially where the insulated material, such as wire, is subjected to movement or bending. In some instances it may be found desirable to mix these stabilized polyvinyl resins with other plastic materials, such as cellulose acetate, acetate propionate or acetate butyrate; cellulose ethers, such as ethyl cellulose, gums, other resins, either natural or synthetic, waxes and oils.

Partial polyvinyl acetal resins may be stabilized in accordance with my invention. For example, if a polyvinyl butyraldehyde acetal resin, made by condensing butyraldehyde with polyvinyl alcohol according to French Patent No. 792,661 of Carbide and Chemicals Corporation in which from about 2.5 to about 4 molecules of polvinyl alcohol are combined with each molecule of butyraldehyde, is dissolved in alcohol before heat-drying and subjected to the action of an NOH containing compound such as hydroxylamine hydrochloride, a stable acetal resin results which is especially adapted to use for preparing an intermediate layer in the making of laminated glass. If desired, the acetal resin may be treated with the hydroxylamine by adding it to the solution of the resin which is to be employed to make the commercial product, such as sheeting. Also, if desired, the treatment may be applied to the polyvinyl alcohol or to the polyvinyl ester from which the alcohol is made instead of to the resin itself.

It is to be understood that when valency is referred to herein, it is the type of valency commonly employed in organic chemistry and may ordinarily be determined in a given instance by the number of bonds holding radicals or substituents to the atom.

The acetals which may be stabilized by my process need not be complete acetals. The polyvinyl acetal resins listed herein may be either complete acetals or they may be resins having residual acetyl and/or hydroxyl groups remaining on the molecule.

What I claim is:

1. The process of stabilizing polyvinyl acetal resins which comprises subjecting a solution of a compound selected from the group consisting of the resins and the polyvinyl esters and alcohols which are used in their preparation to the action of a compound selected from the group consisting of the compounds containing NOH groups (N being trivalent) and their salts.

2. The process of stabilizing polyvinyl acetal resins which comprises subjecting a solution of a compound selected from the group consisting of the resins and the polyvinyl esters and alcohols which are used in their preparation to the action of a hydroxylamine.

3. The process of stabilizing a polyvinyl acetal resin which comprises condensing an aldehyde with a polyvinyl fatty acid ester in the presence of a compound selected from the group consisting of the compounds containing NOH groups (N being trivalent) and their salts.

4. The process of stabilizing a polyvinyl acetal resin which comprises condensing an aldehyde with a polyvinyl fatty acid ester in the presence of a hydroxylamine.

5. The process of stabilizing a polyvinyl acetal resin which comprises condensing an aldehyde with a polyvinyl fatty acid ester in the presence of an oxime.

6. The process of stabilizing a polyvinyl acetal resin which comprises subjecting a polyvinyl acetate to the action of a compound containing an NOH group and then preparing a polyvinyl acetal therefrom.

7. The process of stabilizing a polyvinyl acetal resin which comprises treating the resin while in solution with a hydroxylamine.

8. The process of stabilizing a partial polyvinyl acetal resin in which about 2.5–4 molecules of polyvinyl alcohol are combined with each molecule of aldehyde which comprises subjecting a solution thereof to the action of a hydroxylamine.

9. A composition of matter comprising a polyvinyl acetal resin and a compound selected from the group consisting of compounds containing NOH groups (N being trivalent) and their salts.

10. A composition of matter comprising a polyvinyl acetal resin and a hydroxylamine.

11. A composition of matter comprising a polyvinyl acetal resin and hydroxylamine hydrochloride.

12. A composition of matter comprising a polyvinyl acetal resin and an oxime.

13. A composition of matter comprising a polyvinyl acetaldehyde acetal resin and a hydroxylamine.

14. A hydroxylamine-stabilized polyvinyl acetal resin.

15. A transparent layer essentially consisting of a hydroxylamine-stabilized polyvinyl acetal resin.

JOSEPH B. HALE.